(12) United States Patent
Tucker et al.

(10) Patent No.: US 11,670,260 B2
(45) Date of Patent: Jun. 6, 2023

(54) AUGMENTED REALITY SYSTEM

(71) Applicant: McLaren Automotive Limited, Surrey (GB)

(72) Inventors: Stephen Gordon David Tucker, Surrey (GB); Hugo Peter Cohn, Surrey (GB); Simon Lacey, Surrey (GB)

(73) Assignee: MCLAREN AUTOMOTIVE LIMITED, Surrey (GB)

( * ) Notice: Subject to any disclaimer, the term of this patent is extended or adjusted under 35 U.S.C. 154(b) by 0 days.

(21) Appl. No.: 17/162,960

(22) Filed: Jan. 29, 2021

(65) Prior Publication Data
US 2021/0241723 A1 Aug. 5, 2021

(30) Foreign Application Priority Data

Jan. 31, 2020 (GB) ........................... 2001390

(51) Int. Cl.
*G09G 5/37* (2006.01)
*B60Q 9/00* (2006.01)
*G02B 27/01* (2006.01)

(52) U.S. Cl.
CPC ............. *G09G 5/37* (2013.01); *B60Q 9/00* (2013.01); *G02B 27/0172* (2013.01); *G02B 2027/014* (2013.01); *G02B 2027/0141* (2013.01); *G09G 2354/00* (2013.01); *G09G 2380/10* (2013.01)

(58) Field of Classification Search
CPC .. G09G 5/37; G09G 2354/00; G09G 2380/10; B60Q 9/00; B60Q 9/008; G02B 27/0172; G02B 27/017; G02B 27/0179; G02B 2027/014; G02B 2027/0141; G02B 2027/0187; G06F 3/147; G06T 19/006
See application file for complete search history.

(56) References Cited

U.S. PATENT DOCUMENTS

| | | | | |
|---|---|---|---|---|
| 2012/0287040 | A1* | 11/2012 | Moore | G06F 3/012 345/157 |
| 2013/0076787 | A1* | 3/2013 | Mathieu | G02B 27/01 345/633 |
| 2016/0209647 | A1* | 7/2016 | Fürsich | G02B 27/0075 |
| 2017/0187963 | A1* | 6/2017 | Lee | G06V 20/56 |
| 2017/0235135 | A1* | 8/2017 | Ishiguro | G02B 27/0149 345/633 |
| 2020/0090375 | A1* | 3/2020 | Mori | G02B 27/01 |

FOREIGN PATENT DOCUMENTS

WO 2020110270 A1 6/2020

OTHER PUBLICATIONS

Search Report from corresponding Great Britain Patent Application No. 2001390.0, dated Jul. 13, 2020.

* cited by examiner

*Primary Examiner* — Brent D Castiaux
(74) *Attorney, Agent, or Firm* — Dergosits & Noah LLP

(57) ABSTRACT

An augmented reality system for assisting the driver of a vehicle comprising a display headset, a positioning system and a display driver configured to generate graphic elements which appear to the driver to move independently with respect to one another.

23 Claims, 4 Drawing Sheets

AUGMENTED REALITY SYSTEM

CROSS-REFERENCE TO RELATED APPLICATIONS

The present application claims the benefit of Great Britain Patent Application No. 2001390.0, entitled "AUGMENTED REALITY SYSTEM" filed on Jan. 31, 2020, the contents of which are hereby incorporated by reference.

TECHNICAL FIELD

This invention relates to an augmented reality system for the driver of a vehicle which is configured to display graphic elements which appear to the driver to be stationary relative to four independent frames of reference.

BACKGROUND

Devices incorporating an augmented reality display are becoming increasingly popular.

Augmented reality headsets which display content that appears to the wearer to be stationary relative to the headset are frequently implemented for a range of uses. It is known for the driver of a vehicle to perceive their environment through an augmented reality display which displays information having an apparent position that remains fixed relative to the driver's field of view, known as "head-locked".

An alternative way of displaying information on an augmented reality headset is to display content so that it appears to the wearer to be in a position that is fixed relative to the vehicle. For example, information is displayed such that it appears to the wearer to be superimposed onto the vehicle's dashboard. Information displayed in this way could be described as "cabin-locked".

Furthermore, augmented reality devices are known which display content on a head-set or vehicle windshield display so that the content's position appears to be fixed relative to the vehicle's environment. Information which is displayed such that it appears to the wearer to be stationary relative to the environment could be described as "world-locked". An example of "world-locked" content could be navigation information which appears to be overlaid onto the road ahead of the vehicle.

SUMMARY OF THE INVENTION

According to one aspect there is provided an augmented reality system for assisting the driver of a vehicle being driven on a surface in an environment, the environment including one or more dynamic bodies, the system comprising a display headset comprising an at least partially transparent display pane; a positioning system configured to determine the relative positions of the display headset, the vehicle, the surface and at least one dynamic body external to the vehicle; and a display driver configured to generate, in dependence on the relative positions determined by the positioning system, graphic elements on the at least partially transparent display pane, the display driver being configured such that, to a wearer of the display headset, at least one graphic element appears stationary relative to the display headset; at least one graphic element appears stationary relative to the vehicle notwithstanding motion of the display headset relative to the vehicle; at least one graphic element appears stationary relative to the surface; and at least one graphic element appears stationary relative to the at least one dynamic body external to the vehicle.

The display driver may be configured to display a first, second, third and fourth graphic element such that each graphic element appears, to the wearer of the display device, to move independently with respect to each of the other graphic elements and wherein the first graphic element appears, to the wearer of the display headset, stationary relative to the display headset; the second graphic element appears, to the wearer of the display headset, stationary relative to the vehicle; the third graphic element appears, to the wearer of the display headset, stationary relative to the surface; and the fourth graphic element appears, to the wearer of the display headset, stationary relative to the at least one dynamic body external to the vehicle.

The positioning system may be arranged to characterise a vector between the viewpoint of the wearer of the display headset and each one of the display headset, the vehicle, the surface and the at least one dynamic body external to the vehicle.

The display driver may be configured to generate graphic elements such that a vector between the viewpoint of the wearer of the display headset and the at least one graphic element which appears, to a wearer of the display headset, stationary relative to the display headset, does not move relative to any vector between the viewpoint of the wearer of the display headset and the display headset; and a vector between the viewpoint of the wearer of the display headset and the at least one graphic element which appears, to a wearer of the display headset, stationary relative to the vehicle, is equal in direction to the vector between the viewpoint of the wearer of the display headset and the vehicle; and a vector between the viewpoint of the wearer of the display headset and the at least one graphic element which appears, to a wearer of the display headset, stationary relative to the surface, is equal in direction to the vector between the viewpoint of the wearer of the display headset and the surface; and a vector between the viewpoint of the wearer of the display headset and the at least one graphic element which appears, to a wearer of the display headset, stationary relative to the at least one dynamic body external to the vehicle is equal in direction to the vector between the viewpoint of the wearer of the display headset and the at least one dynamic body external to the vehicle.

The augmented reality system may be configured such that at least one graphic element which, to the wearer of the display headset, appears stationary relative to the display headset, is any of warning signs, information regarding the operation of the vehicle, safety information or video content.

The augmented reality system may be configured such that at least one graphic element which, to the wearer of the display headset, appears stationary relative to the vehicle, is any of virtual instruments, information regarding the operation of the vehicle, navigation information and video content.

The augmented reality system may be configured such that at least one graphic element which, to the wearer of the display headset, appears stationary relative to the surface, is any of navigation information, track information and hazard identifiers.

The augmented reality system may be configured such that at least one graphic element which, to the wearer of the display headset, appears stationary relative to the at least one dynamic body external to the vehicle, is a hazard identifier.

The positioning system may be configured to determine whether the at least one dynamic body external to the vehicle is moving with respect to the vehicle, and having determined that the at least one dynamic body external to the vehicle is moving with respect to the vehicle, is further configured to determine whether the at least one dynamic body is moving towards or away from the expected path of the vehicle.

The display driver may be configured to generate a graphic element being a hazard identifier, which to the wearer of the display headset appears stationary relative to the at least one dynamic body, if the positioning system determines that the at least one dynamic body external to the vehicle is moving towards the expected path of the vehicle.

The display driver may be configured to generate a graphic element being a braking or turning point indicator, which to the wearer of the display headset appears stationary relative to the surface, if the positioning system determines that the at least one dynamic body external to the vehicle is moving towards the expected path of the vehicle.

The augmented reality system may be configured for assisting the driver of a vehicle being driven on a road, the display driver being configured to generate graphic elements which comprise warning signs, which to the wearer of the display headset appear stationary relative to the display headset; information regarding the operation of the vehicle, which to the wearer of the display headset, appear stationary relative to the vehicle; navigation information, which to the wearer of the display headset, appear stationary relative to the road; and hazard identifiers, which to the wearer of the display headset, appear stationary relative to the at least one dynamic body external to the vehicle.

The augmented reality system may be configured for assisting the driver of a vehicle being driven on track, the display driver being configured to generate graphic elements which comprise warning signs, which to the wearer of the display headset appear stationary relative to the display headset; information regarding the operation of the vehicle, which to the wearer of the display headset, appear stationary relative to the vehicle; track information, which to the wearer of the display headset, appear stationary relative to the road; and hazard identifiers, which to the wearer of the display headset, appear stationary relative to the at least one dynamic body external to the vehicle.

The augmented reality system may be configured to obtain an environment map and the display driver may be configured to generate graphic elements in dependence on track information provided by the environment map.

The display driver may be configured to generate at least one graphic element which, to wearer of the display headset, appears stationary relative to the surface, and is track information, and is generated in dependence on one or more of braking point indicators, acceleration point indicators and driving lines.

The augmented reality system may be configured to record a first route taken by a vehicle driven on a surface; and upon the vehicle being driven again on the surface, the display driver may be configured to display at least one graphic element, which to a wearer of the display headset appears stationary relative to the surface, wherein the at least one graphic element is a driving line which represents the first route taken by the vehicle.

The augmented reality system may be configured to record dynamic states of the vehicle in order to detect wheel slip of the vehicle during the first route taken by the vehicle on the surface; and upon the vehicle being driven again on the surface, the display driver may be configured to display graphic elements, which to a wearer of the display headset appear stationary relative to the surface, wherein at least one graphic element indicates one or more portions of the first route in which wheel slip of the vehicle was detected, and at least one graphic element is a driving line which indicates a second route to be taken by the vehicle, and wherein the second route is formulated such that the vehicle avoids the one or more portions of the first route in which wheel slip of the vehicle was detected.

The augmented reality system may be configured to communicate with a display of a vehicle configured to display graphic elements, the system being further configured to deactivate at least part of the vehicle display such that graphic elements are not duplicated on the vehicle display and the display headset of the augmented reality system.

The display headset may comprise a pair of augmented reality glasses and the at least partially transparent display pane may be one or more lenses of the augmented reality glasses.

The display headset may comprise a helmet and the at least partially transparent display pane may be a visor of the helmet.

According to a second aspect there is provided a method comprising determining the relative positions of a vehicle; a display headset worn by a driver of the vehicle; a surface on which the vehicle is being driven; one or more dynamic bodies of an environment in which the vehicle is being driven, the one or more dynamic bodies being external to the vehicle; and generating first, second, third and fourth graphic elements on an at least partially transparent display pane of the display headset such that each graphic element appears, to the wearer of the display headset, to move independently with respect to each of the other graphic elements and wherein the first graphic element appears, to a wearer of the display headset, stationary relative to the display headset; the second graphic element appears, to a wearer of the display headset, stationary relative to the vehicle notwithstanding motion of the display headset relative to the vehicle; the third graphic element appears, to a wearer of the display headset, stationary relative to the surface; and the fourth graphic element appears, to a wearer of the display headset, stationary relative to the at least one dynamic body external to the vehicle.

DETAILED DESCRIPTION OF THE DRAWINGS

Figure 1:
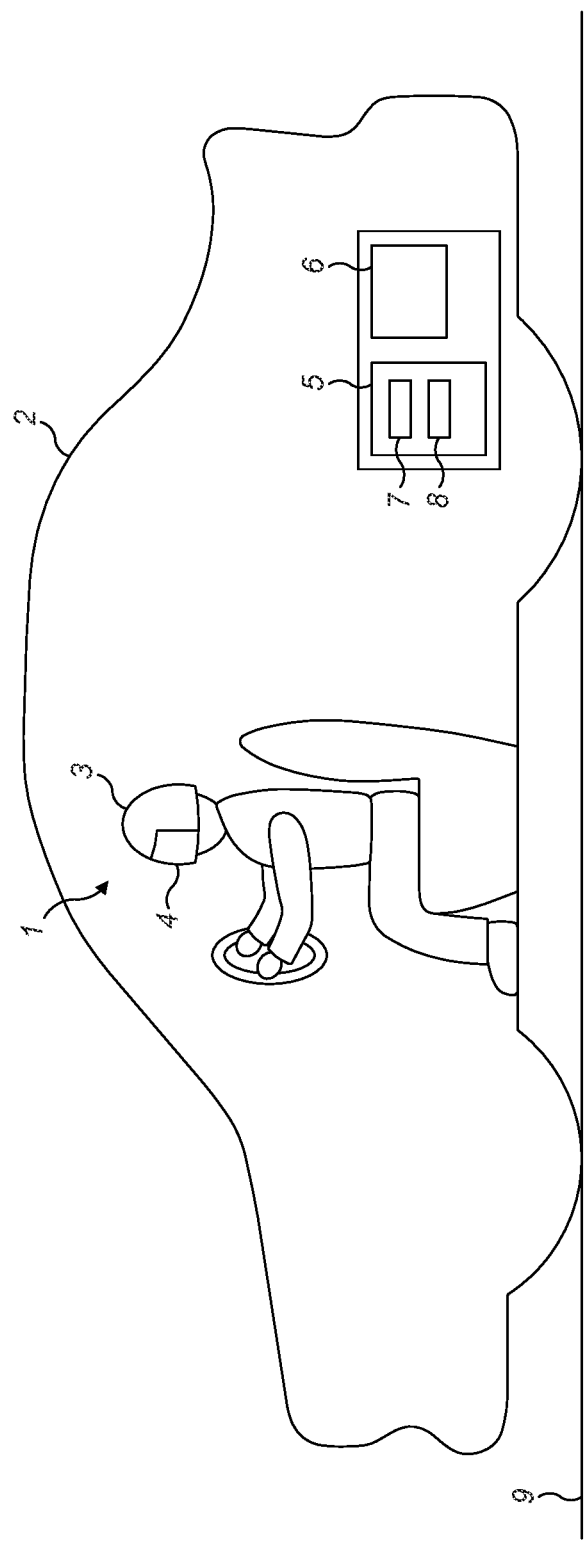
FIG. 1 shows the driver of a vehicle wearing a display headset.

FIG. 1 shows a driver of a vehicle 2 wearing a display headset 3. The vehicle 2 is being driven on a surface 9. In the following description, being driven on a surface means that the vehicle is in motion on the surface. In other words, when a vehicle is being driven on a surface the vehicle is moving relative to the surface. Augmented reality system 1 comprises display headset 3, positioning system 6, display driver 5, processor 7 and memory storage unit 8.

In FIG. 1, the positioning system, display driver, processor and memory storage are integral to vehicle 2. In another example, each component may be integral to the display headset. In further examples, each component may comprise parts which are distributed between the vehicle and the display headset.

The positioning system 6 is configured to determine the relative positions of the display headset 3, the vehicle 2, the surface on which the vehicle is positioned 9 and at least one dynamic body external to the vehicle (not shown).

The positioning system may comprise one or more sensors positioned on one or more of the display headset, the interior of the vehicle and the exterior of the vehicle. For example, the positioning system could be implemented using an accelerometer on both the display headset and the vehicle and using cameras mounted to the vehicle for viewing the external environment. Cameras may also be mounted on the inside of the vehicle, for example for viewing the display headset. Cameras may also be positioned on the display headset. The output of the accelerometers on the display headset and the vehicle may be compared to determine a relative acceleration between the display headset and the vehicle. The output of the accelerometers on the display headset and the vehicle may be used to determine the relative positions of the display headset and the vehicle. The relative positions may include coordinates in 3D space, as well as the pose of the display headset relative to the vehicle. For example, determining relative positions may include determining relative orientations in pitch, roll and yaw. The cameras mounted on the vehicle may image the region in front of the vehicle including the surface on which the vehicle is positioned. Images taken from the cameras may be compared with the known motion of the vehicle determined by the accelerometer mounted on the vehicle. Images taken from the cameras may be compared with the output of the accelerometer on the vehicle to determine a relative acceleration between the vehicle and the surface. Images taken from the cameras may be compared with the output of the accelerometer on the vehicle to determine the relative position of the vehicle relative to the surface. Images taken from cameras mounted on the vehicle may also be used to determine the presence of one or more dynamic bodies external to the vehicle. Inconsistencies in a series of images taken from the cameras may indicate the presence of one or more dynamic bodies. In the following description, a dynamic body is an object external to the vehicle which is in motion relative to the surface. An example of a dynamic body external to vehicle 2 (which includes augmented reality system 1) is second vehicle 10 shown in FIG. 2. A series of images may be used to determine which elements of the region in front of the vehicle are static elements of the environment. A series of images may be used to determine the motion of one or more dynamic bodies. A series of images may be used to determine the position of the one or more dynamic bodies relative to the surface. Images containing one or more dynamic bodies taken from the cameras may be compared with the output of the accelerometer on the display headset to determine the position of the one or more dynamic bodies relative to the display headset. Images containing one or more dynamic bodies taken from the cameras may be compared with the output of the accelerometer on the vehicle to determine the position of the one or more dynamic bodies relative to the vehicle.

In one example, the dynamic body may be another vehicle fitted with a positioning system. In this example, the dynamic body may communicate its position and orientation to the vehicle, and vice versa.

Any type and any combination of sensors could be implemented which enable the positions of the display headset, the vehicle, the surface and at least one dynamic body to be determined. The positioning system may be integrated into vehicle 2 (as shown in FIG. 1) or into the display headset 3. The positioning system may comprise components which are integrated into the display headset and the vehicle. The positioning system may comprise a single processor or may comprise multiple distributed processors. For example the positioning system may comprise multiple distributed processors located in one or more of the display headset and the vehicle. The positioning system may be separate from the display driver 5. Alternatively, the positioning system may be integrated with the display driver 5.

The positioning system is arranged to characterise a vector between the viewpoint of the driver of the vehicle (and wearer of the display headset) and each of the display headset 3, vehicle 2, surface 9 and one or more dynamic bodies external to the vehicle (e.g. second vehicle 10). The vector is calculated in 3D space. In each case, the vector characterised may be between the viewpoint of the wearer of the display headset and a single point on each one of the display headset, the vehicle, the surface and the at least one dynamic body external to the vehicle, respectively. The relative positions of any of the display headset, the vehicle, the surface on which the vehicle is positioned and one or more dynamic bodies external to the vehicle, may be determined using one or more sensors. The relative positions may include relative orientations.

The display headset 3 is configured to be worn on the head of the driver. The display headset may comprise a piece of hardware which is worn on the head of the driver and through which a driver may view at least part of their surrounding environment. The display headset 3 shown in FIG. 1 includes an at least partially transparent display pane 4, and when the headset is properly worn, the display pane is positioned in front of the driver's eyes. The display pane may be a completely transparent panel. The driver may view the environment inside and outside the vehicle 2 through the at least partially transparent display pane. In the example shown in FIGS. 1 and 2, the display headset is a helmet and the at least partially transparent display pane is a visor of the helmet. In another example (not shown), the headset is a pair of augmented reality glasses and the display pane is one or more lenses of the glasses.

The display driver 5 is configured to generate graphic elements on the at least partially transparent display pane 4 of the display headset. Graphic elements may be projected onto the transparent display pane or onto another component of the display headset. In the example shown, display driver 5 comprises processor 7 and memory storage unit 8. The memory storage unit 8 is configured to store information in a non-transient way. The memory storage unit is configured to store code that is executable by the processor to enable the display driver to generate graphic elements. The processor could be implemented by one or more of a CPU (central processing unit), GPU (graphics processing unit), FPGA (field-programmable gate array) or HPU (holographic processing unit). The display driver may be integrated into vehicle 2 (as shown in FIG. 1) or into the display headset 3. The display driver may comprise a single processor or may comprise multiple distributed processors, for example located in one or more of the display headset and the vehicle. The display driver may be separate from the positioning system 6. Alternatively, the display driver may be integrated with the positioning system.

The at least partially transparent display pane of the display headset may comprise an integrated display, for example an LED screen. The display pane of the display headset may be configured to display monochrome and colour graphic elements on some areas while other areas of the display remain transparent. Alternatively, the augmented reality system may comprise a projection device configured to project graphic elements onto the display pane. The display headset may comprise fiduciary elements for determining the position the eyes of the driver. In order to calibrate the display pane for displaying graphic elements correctly, the position of the driver's eyes relative to the display headset may be established. Fiduciary elements may be physical head engaging elements such as a nose bridge or arms to be positioned around the driver's ears. Fiduciary elements may also comprise sensors capable of detecting the driver's eye position. For example, the sensor(s) may be one or more cameras and image analysis may be used to determine the position of the driver's eyes relative to the headset.

Figure 2:
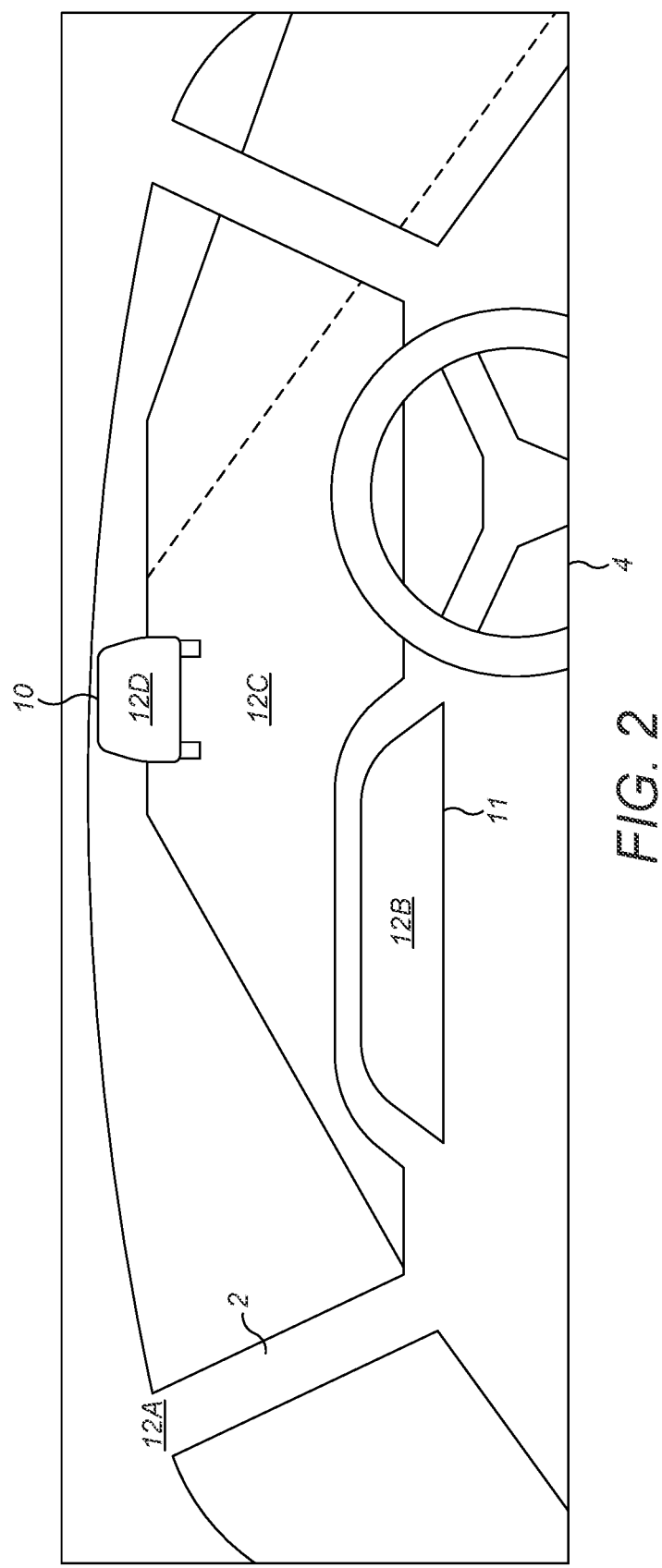
FIG. 2 shows the view of a driver of a vehicle on a road wearing the display headset.

Graphic elements generated by the display driver on the display pane appear to the wearer of the display headset to be superimposed onto their view of the environment inside and outside the vehicle (as shown in FIG. 2). The graphic elements are generated in dependence on the relative positions determined by the positioning system. Specifically, the graphic elements are generated such that the positions of the graphic elements on the display pane are dependent on the relative positions determined by the positioning system. The display driver is configured to co-ordinate at least four reference frames relating to the display headset, the vehicle, the surface on which the vehicle is driven and one or more dynamic bodies external to the vehicle. The display driver is then configured to generate at least one graphic element which appears stationary relative to each of the at least four reference frames. In the following description a graphic element which to the wearer of the display headset appears stationary relative to a particular reference frame means that the apparent position of the graphic element to the wearer is fixed relative to that reference frame. It is understood that the words stationary and fixed encompass very small movements which would be broadly unnoticeable to the wearer of the display headset. For example, a graphic element generated to appear to the wearer of a display headset to be stationary relative to the display headset will have an apparent constant position in the field of view of the wearer in spite of any movement of the wearer's head.

FIG. 2 shows the view of a driver of vehicle 2, wearing display headset 3. In the example shown in FIG. 2, the display pane 4 is completely transparent. The surface on which the vehicle is being driven is a road. FIG. 2 shows a second vehicle 10 on the road in front of first vehicle 2.

Shapes 12A, 12B, 12C and 12D are graphic elements on the display pane of the display headset, generated by the display driver in dependence on the relative positions determined by the positioning system. Each graphic element appears to the driver to be superimposed onto the driver's view of the environment either inside or outside the vehicle. The claimed invention is configured such that, to a wearer of the display headset, at least one graphic element appears stationary relative to the display headset, at least one graphic element appears stationary relative to the vehicle, at least one graphic element appears stationary relative to the surface and at least one graphic element appears stationary relative to one or more dynamic bodies external to the vehicle. The at least one graphic element which appears stationary relative to the display headset, appears to the wearer of the display headset stationary relative to the display headset notwithstanding motion of the display headset relative to the vehicle. The at least one graphic element which appears stationary relative to the vehicle, appears to the wearer of the display headset stationary relative to the vehicle regardless of motion of the display headset. The reference frames relating to the display headset, the vehicle, the surface on which the vehicle is driven and one or more dynamic bodies external to the vehicle move independently of one another. Accordingly, each graphic element may appear to the wearer of the display headset to move independently with respect to each of the other graphic elements.

In the example shown in FIG. 2, from the viewpoint of the driver wearing the display headset, graphic element 12A appears stationary relative to the display headset, 12B appears stationary relative to the first vehicle 2, 12C appears stationary relative to the road and 12D appears stationary relative to the second vehicle 10.

Graphic element 12A appears to the driver to be stationary relative to the display headset. Graphic element 12A is generated according to a vector between the viewpoint of the driver and the display headset. In the example shown, graphic element 12A appears fixed in a top left position of the driver's view. Since the driver is wearing the display headset, the position of the display headset is fixed relative to the position of the driver's head. When the orientation of the driver's head and therefore the position of the display headset changes, graphic element 12A appears to the driver to remain in the same position with respect to the driver's viewpoint. Graphic element 12A will therefore in this example always appear to the driver to be fixed in a top left position of their view. Thus the at least one graphic element which appears stationary relative to the display headset, appears to the wearer of the display headset stationary relative to the display headset notwithstanding motion of the display headset relative to the vehicle.

The content of each graphic element may be any content which is intended to assist or entertain the driver of the vehicle. The content of graphic elements which appear stationary relative to the display headset may be any information which relates to the interaction of the vehicle with its surroundings, including other vehicles. For example graphic element 12A may be one or more of a warning sign, such as a weather warning; safety information for example about the environment surrounding the vehicle such as the distance between the vehicle and a neighbouring vehicle; road information such as nearest junction number; or track information such as lap times. Graphic element 12A may further be video content. In one example, video content may include an instructional video intended to supplement the user guide of the vehicle. An instructional video may for example demonstrate a method for adjusting a vehicle setting.

Graphic element 12B appears to the driver to be stationary relative to the vehicle which is being operated by the driver (in this example, vehicle 2). In the example shown, the graphic element 12B appears to the driver to be superimposed onto the vehicle display unit 11. In other examples, the graphic element may appear to be superimposed onto any element of the vehicle, for example the windscreen, window or steering wheel. The at least one graphic element which appears stationary relative to the vehicle, appears to the wearer of the display headset stationary relative to the vehicle notwithstanding motion of the display headset relative to the vehicle.

The content of each graphic element may be any content which is intended to assist or entertain the driver of the vehicle. The content of graphic elements which appear to the driver to be stationary relative to the vehicle may be information the driver is accustomed to viewing while driving, such as information relating to the on board systems of the vehicle. For example, the content of graphic element 12B may be one or more of virtual instruments such as a speedometer or accelerometer, information regarding the operation of the vehicle, for example the vehicle speed, fuel level, oil level or rev counter; navigation information such as a satellite navigation display or other video content.

Graphic element 12C appears to the driver to be stationary relative to the surface on which the vehicle is being driven, in this example, a road. The apparent position of the graphic element therefore appears fixed relative to the road but may not necessarily appear to be superimposed onto the road. For example, the graphic element may appear to be superimposed onto any other surface or object which is also stationary relative to the road, for example a tree. The content of the graphic element may be one or more of navigation information, track information or hazard identification information. For example, the graphic element may indicate a position on the road at which the vehicle should change direction, accelerate or brake. The graphic element may be a hazard identifier which highlights a hazard which is stationary relative to the road, for example a speed bump or piece of litter.

Finally, graphic element 12D appears to the driver to be stationary relative to second vehicle 10. The graphic element may be generated such that it appears stationary relative to any other type of dynamic body external to the vehicle. In further examples, where there are multiple dynamic bodies external to the vehicle, the display driver may generate one graphic element per dynamic body such that each graphic element appears to the driver to be stationary relative to each of the dynamic bodies.

The position of at least one dynamic body is determined by the positioning system. The positioning system may be configured to determine the position of the at least one dynamic body relative to the display headset. A reference frame corresponding to the at least one dynamic body may be determined by the positioning system. The positioning system may comprise one or more sensors. The positioning system may use any combination or type of sensor to determine the position of the at least one dynamic body. In one example, the positioning system may employ detection technologies such as lidar or radar to determine the positions of dynamic bodies external to the vehicle.

In another example, the positioning system may include cameras which are used to determine positions of dynamic bodies. Cameras positioned to face away from the vehicle are used to image the vehicle's surroundings. Based on a particular image frame captured of the vehicle's surroundings and one or more of the vehicle's speed, steering settings, braking settings, data taken from a satellite navigation system or route history, the augmented reality system may determine the expected path of the vehicle. The augmented reality system may thus determine the expected content of a subsequent image frame captured of the vehicle's surroundings. Each image frame may be used to update and/or refine the expected path of the vehicle. Taking as its input the vehicle's speed and expected route at time t, the augmented reality system is configured to calculate the expected future position of the vehicle relative to its surroundings at later time t'. Inherently, the augmented reality system is also configured to calculate the expected future position of the vehicle's surroundings relative to the vehicle at time t'. For example, the augmented reality system may expect a certain point on the road corresponding to a particular pixel in an image frame captured at time t to appear in a subsequent image frame captured at time t' to correspond to a different pixel.

Where a point in a captured image corresponds to a point in the vehicle's surroundings, a deviation of the point in the image from its expected future position (pixel) in a later image suggests that an unexpected body is present in the vehicle's surroundings. Specifically it suggests that an unexpected body is located between the vehicle and the point in the vehicle's surroundings. Once an unexpected body is detected, calculating an expected future position of the body and comparing it with an actual future position of the body allows the augmented reality system to determine whether or not the unexpected body is stationary relative to the vehicle's surroundings. The augmented reality system may thus determine whether the unexpected body is a dynamic body. A dynamic body is an object external to the vehicle which is in motion relative to the surface. If it is determined that the unexpected body is a dynamic body, an additional reference frame is co-ordinated in order to generate a graphic element which appears stationary relative to the dynamic body. The process described is repeated with respect to each detected unexpected body in the vehicle surroundings. Similar methods may be implemented using different types of sensors.

The apparent position of the graphic element 12D appears fixed relative to vehicle 10 but may not necessarily appear to be superimposed onto the vehicle as is shown in FIG. 2. For example, the graphic element may appear to be separate from the dynamic body so as not to obscure the driver's view of the dynamic body, for example the graphic element could comprise a ring around the dynamic body or an arrow pointing to the dynamic body. Alternatively, in one example, where the visibility of dynamic bodies is reduced, for example due to darkness or fog, the graphic element may be entirely superimposed onto the dynamic body so that the driver is aware of the exact location of the dynamic body. The graphic element which appears to the driver to be stationary relative to a dynamic body external to the vehicle may be a hazard identifier. The content of the graphic element which appears to the driver to be stationary relative to a dynamic body external to the vehicle is any content which intended to draw the attention of the driver to the dynamic body, for example, a ring, an arrow or a piece of text. In examples where the graphic element is positioned intentionally to obscure what the driver sees of the dynamic body (for example when the vehicle is being driven in darkness), the appearance of the graphic element may be intended to replicate the appearance of the dynamic body itself. The display driver may thus generate graphic elements which educate the driver as to the type of the one or more dynamic bodies which are in the vicinity of the vehicle. For example, if the driver cannot make out that a dynamic body is a pedestrian, the display driver may generate a graphic element which has the appearance of a pedestrian. The graphic element having the appearance of a pedestrian may appear to the driver of the vehicle to be stationary relative to the pedestrian.

In another example where an oncoming vehicle has not dipped their headlights, the display driver may be configured to generate one or more graphic elements which appear to the driver to be superimposed onto the headlights. The one or more graphic elements may be generated to block the headlights from the view of the driver. The one or more graphic elements may appear to the driver to be stationary relative to the oncoming vehicle. The one or more graphic elements may appear to the driver to be stationary relative to the headlights of the oncoming vehicle. In one example, where one or more cameras are mounted on the vehicle and image the region in front of the vehicle, headlights of oncoming vehicles may be detected in images captured by the one or more cameras. A series of images may be used to detect oncoming vehicles which move relative to static elements of the environment. The display driver may be configured to generate one or more graphic elements to be superimposed onto headlights of oncoming vehicles if it is determined that the headlights constitute a hazard. Headlights may be considered to constitute a hazard if they are likely to have a dazzling effect on the driver. Headlights may be considered to constitute hazard if it is determined that they have a light intensity value which is above a predetermined value of intensity. Headlights may be considered to constitute a hazard if it is determined that they have a light intensity value which is considerably higher than the light intensity of the vehicle surroundings.

However, the dynamic body may not always constitute a hazard and thus the graphic element may not always be a hazard identifier. In an example where the dynamic body is a vehicle, a graphic element may be displayed to highlight the position of the vehicle, even if the vehicle does not currently constitute any risk. For example, in a race, it may be helpful to the driver of a racing vehicle to have the position/performance of a competing vehicle ahead highlighted.

In the example view of a driver shown in FIG. 2, there are four graphic elements where one respective graphic element appears stationary relative to each of the display headset, the vehicle, the surface and the at least one dynamic body external to the vehicle. However, in other examples, there may be more than four graphic elements.

Examples of the content of each graphic element is given above but the specific content of each graphic element may be any content which is intended to assist the driver in operating the vehicle. Alternatively, each graphic element may comprise content which is intended to entertain the driver (to be used primarily when the vehicle is stationary).

The present augmented reality system is therefore configured to display "head-locked", "cabin-locked" and "world-locked" content. The system is further configured to detect potential hazards in the vehicle's environment which are in motion relative to the environment and to display content which appears to the driver to be stationary relative to one or more of those hazards.

Systems of this type can have the advantage that they are configured to co-ordinate four independent frames of reference and display content which appears stationary relative to each of those reference frames.

Figure 3:
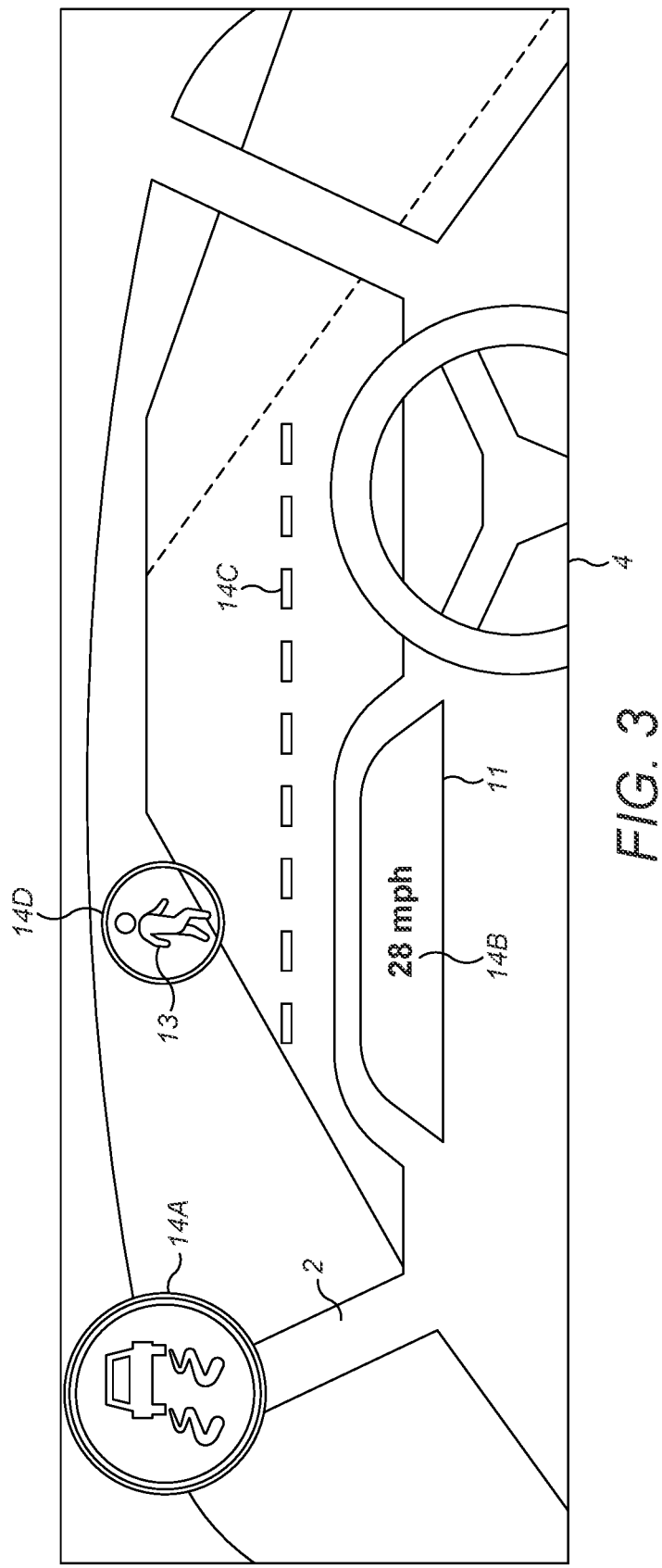
FIG. 3 shows the view of a driver of a vehicle on a road wearing the display headset. The driver's view includes a pedestrian moving towards the expected path of the vehicle.

FIG. 3 shows the view of a driver of a vehicle which includes a dynamic body external to the vehicle. A dynamic body is an object external to the vehicle which is in motion relative to the surface. FIG. 3 shows the view of a driver of a vehicle including a pedestrian 13 external to the vehicle. Graphic element 14A which, from the viewpoint of the driver appears stationary relative to the display headset, comprises a warning that the road surface is slippery. Graphic element 14C which, from the viewpoint of the driver, appears stationary relative to the road, is a braking point indicator. Graphic element 14D is a hazard identifier and appears from the viewpoint of the driver to be stationary relative to pedestrian 13. Graphic element 14B appears, from the viewpoint of the driver to be stationary relative to the vehicle and comprises an indication of the current speed of the vehicle. In this example, graphic element 14B appears to be superimposed onto the vehicle display unit 11.

In contrast to previously developed vehicles which were commonly fitted with physical instruments, modern vehicles often comprise only non-physical instruments, for example virtual speedometers displayed on a display device such as vehicle display unit 11. Modern vehicles also often display other types of information on a display unit including video content such as navigational information. Since the augmented reality system is configured to display graphic elements which comprise content often also visible on a vehicle display unit, the augmented reality system is configured to communicate with the display of a vehicle and deactivate at least part of the vehicle display such that content is not displayed on the vehicle display unit as well as on the display headset. The system is configured to deactivate at least part of the vehicle display such that graphic elements are not duplicated on the vehicle display unit and the display headset.

This feature is advantageous as avoiding duplication of content may enable available display space to be optimised while allowing the driver to view as much useful content as possible. The present system is configured to address problems which arise in a system capable of displaying content fixed relative to four independent frames of reference. In particular the system may provide solutions which reduce overcrowding of the driver's view and improve the safety of the driver. The augmented reality system may be configured to communicate with a vehicle display to ensure that content is not duplicated across the vehicle display and the display headset.

In one example, wherein the entire vehicle display unit shows satellite navigation which is also the content of one or more graphic elements on the display pane of the display headset, the augmented reality system sends instructions to the vehicle display to switch off. Switching off at least part of the vehicle display unit when not required may minimise potential distractions and encourage the driver to keep his or her eyes on the road ahead. Furthermore, over-crowding of the driver's view may be reduced and the energy usage of the vehicle may be improved. In another example, the driver can communicate with the augmented reality system to remove one or more graphic elements from the display headset. The driver may instruct the system to remove a graphic element from the display of the display headset using physical controls, GUI or voice instruction.

Using techniques described above, the positioning system is configured to determine whether a dynamic body external to the vehicle is moving with respect to the vehicle. Where the dynamic body comprises a positioning system, information about the dynamic body's position may be transmitted to the vehicle. In the example shown in FIG. 3 the positioning system determines whether pedestrian 13 is moving with respect to vehicle 2. The positioning system also determines an expected path of the vehicle, for example using the techniques previously described. The positioning system determines whether the pedestrian is moving towards or away from the expected path. The positioning system may be configured to determine the relative speeds of the pedestrian and the vehicle. The positioning system may be configured to determine whether the expected path of the vehicle and the expected path of the pedestrian are likely to intersect concurrently. Accordingly, the positioning system may be configured to determine whether a collision between the vehicle and the pedestrian is possible if the expected paths are followed.

In one example, the display driver is configured to display a graphic element being a hazard identifier, which to the driver appears stationary relative to the dynamic body, if the positioning system determines that the dynamic body is moving towards the expected path of the vehicle. As described above, the positioning system may be configured to determine an expected path of the vehicle. Once the pedestrian is detected by the positioning system, the expected and actual future positions of the pedestrian are compared to determine whether the unexpected body is stationary relative to the vehicle's surroundings. Using processes described above, the direction of motion of the pedestrian is calculated and the positioning system determines whether the pedestrian is moving towards or away from the expected path of the vehicle. In the example shown in FIG. 3, pedestrian 9 is approaching the road and the positioning system determines that the pedestrian is moving towards the expected path of the vehicle.

Having determined that the pedestrian is moving towards the expected path of the vehicle, the display driver generates graphic element 14D which is displayed on the transparent display pane 4 with an apparent position which is fixed with respect to pedestrian 13. Graphic element 14D appears to the driver to be stationary relative to pedestrian 13. In this example, graphic element 14D is a hazard identifier which takes the form of a ring around the pedestrian moving towards the expected path of the vehicle.

The display driver may be configured to display the hazard identifier so that it appears to the driver of the vehicle to be stationary relative to the dynamic body. The display driver may be configured such that it only generates a graphic element comprising a hazard identifier if the positioning system has determined that a dynamic body is moving towards the expected path of the vehicle.

A large proportion of the number of deaths caused by road traffic accidents each year are preventable with improved driver hazard recognition. To improve the safety of vehicle drivers, passengers and pedestrians, it is advantageous for an augmented reality system to identify potential hazards external to the vehicle and bring the driver's attention to those hazards.

The present system is configured to address problems which arise in a system capable of displaying content fixed relative to four independent frames of reference. The system may be configured to display hazard related information only for potential hazards which are classified as real hazards.

Therefore in one example, the provided augmented reality system is configured to display a subset of all available information. The subset of all available information may be determined by an algorithm used to calculate the most useful information available to the driver in a particular situation. The system may therefore have the advantage of reducing the amount by which the driver's view is obscured. In one example, the subset of information may represent a subset of hazard identifiers. The augmented reality system may be configured to only display information relating to real hazards and not all potential hazards. Therefore, a further advantage of the augmented reality system is the ability to distinguish real hazards and display only hazard identifiers which draw the driver's attention to those real hazards. The augmented reality system may be configured to distinguish real hazards by determining an expected path of the potential hazard and an expected path of the vehicle and determining whether the expected paths are likely to intersect concurrently. The augmented reality system may be configured to determine whether a collision between the vehicle and the potential hazard is possible if the expected paths are followed. The augmented reality system may be configured to determine whether the potential hazard is likely to interfere with the vehicle's expected path. The augmented reality system may be configured to only draw the driver's attention towards real hazards. This feature has the advantage that over-crowding of the driver's view may be reduced.

To further enhance the safety of the driver, vehicle passengers and surrounding pedestrians, the augmented reality system is also capable of displaying content which usefully guides the driver to modify the vehicle's path in order to avoid the identified real hazard, for example graphic element 14C which is a braking point indicator.

Graphic element 14C, from the viewpoint of the driver, appears stationary relative to the road. The positioning system may be configured to determine a recommended braking point for the vehicle in response to determining that a dynamic body external to the vehicle is moving towards the expected path of the vehicle. The braking point may be a point at which the driver should apply the vehicle's brakes in order to avoid a collision with the pedestrian (according to the expected path of the vehicle and pedestrian.) The augmented reality system may be configured to determine a distance from the dynamic body at which vehicle brakes should be applied in order that the vehicle stops before reaching the dynamic body. The augmented reality system may be configured to determine a distance at which the vehicle must begin to decelerate in order that the vehicle stops before reaching the dynamic body. The positioning system may alternatively or further be configured to determine a recommended turning point at which the vehicle should change direction in response to determining that a dynamic body external vehicle is moving towards the expected path of the vehicle. In response to the positioning system determining a recommended braking and/or turning point, the display driver may be configured to generate a graphic element which to the driver appears stationary relative to the surface and indicates the position of the braking point and/or turning point. The augmented reality system may be configured to determine the recommended braking point taking account of recorded wheel slip of the vehicle. The augmented reality system may be configured to determine the recommended braking point taking account of road conditions, for example due to wet weather.

As shown in FIG. 3, in response to the positioning system determining that pedestrian 13 is moving towards the expected path of the vehicle, the display driver generates a graphic element which is displayed on the transparent display pane and appears to the driver to be stationary relative to the road. In this example, graphic element 14C is a dotted line representing a braking point but may take any other form.

The augmented reality system therefore not only highlights relevant hazards but may also provide information to the driver regarding how to manoeuvre the vehicle to avoid them. The safety of the driver and surrounding pedestrians may therefore be improved.

The examples described above refer to the implementation of the augmented reality system in a vehicle being driven on a road.

It is desirable for an augmented reality system to be adaptable for use on a race track as well as a road. The augmented reality system may be configured to display content which indicates to the driver recommended track routes based on external historical data and the driver's own recorded driving history. The present system may therefore be advantageous for the driver with regards to both safety and performance.

The following examples may be implemented in a vehicle being driven on any surface but may be most usefully implemented in a vehicle being driven on a race track.

For a vehicle being driven on a race track, the augmented reality system may be configured to record a first route taken by the vehicle driven around the track, and when the vehicle is driven again on the track (for example on a second lap), the display driver may be configured to display at least one graphic element representing the first route taken by the vehicle. The graphic element may appear to the driver of the vehicle to be stationary relative to the track. The graphic element may be a driving line. A driving line may also be generated using information gathered by sensors on the vehicle.

The augmented reality system may be configured to obtain an environment map which may include track information. The environment map be obtained from an external source. For example, the environment map may be obtained using a wireless network. Alternatively, the environment map may be generated onboard the vehicle, for example using input from sensors. The environment map may comprise track information about a well-known race track, and may include for example track layout and elevation. The environment map may further comprise data regarding routes previously taken around the track including routes previously taken by other drivers.

The display driver may be configured to generate graphic elements in dependence on track information provided by the environment map. For example, the environment map may contain data regarding the fastest possible route around the track. The display driver may generate graphic elements on the display pane of the display headset which encourage the driver of a vehicle to follow the fastest possible route around the track. Such graphic elements may include acceleration, braking and turning point indicators. Graphic elements may further be driving lines indicating a route to be followed.

Figure 4:
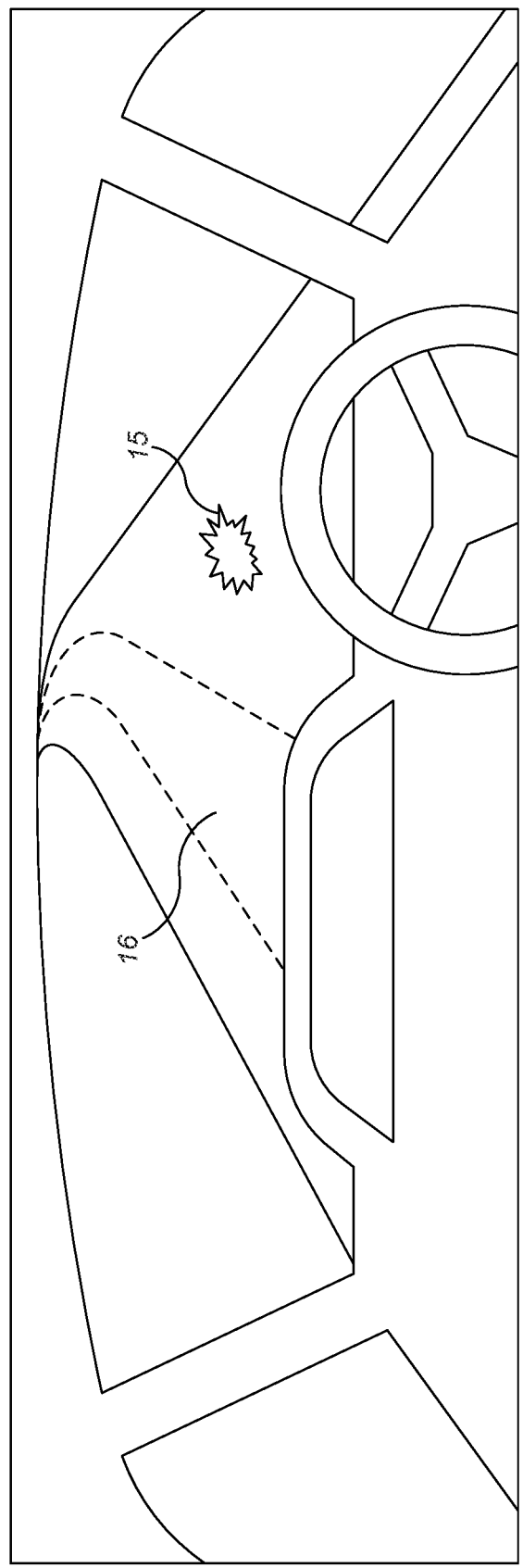
FIG. 4 shows the view of a driver of a vehicle on a track wearing the display headset. The driver's view includes a graphic element indicating a track portion in which wheel slip was recorded and driving lines indicating a recommended route to be taken by the vehicle in order to avoid the indicated track portion.

The augmented reality system may further be configured to determine parameters about the vehicle during a first route taken by the vehicle around the track. For example, the augmented reality system may be configured to record wheel slip of the vehicle during a first route taken by the vehicle around the track. When the vehicle is driven again on the track, the display driver may be configured to display graphic elements which appear to be superimposed on the track and indicate one or more portions of the first route in which wheel slip of the vehicle was recorded, for example graphic element 15 shown in FIG. 4. The graphic elements may appear to the driver to be stationary relative to the track. In response to determining track portions in which wheel slip occurred, the augmented reality system may be configured to determine a second route to be taken by the vehicle. The second route may be formulated such that the vehicle avoids the one or more track portions in which wheel slip of the vehicle was recorded. The display driver may be configured to generate graphic elements such as driving lines 16 which indicate the second (recommended) route, as seen in FIG. 4. The graphic elements indicating the second route may appear to the driver to be stationary relative to the track. The graphic elements indicating the second route may appear to be superimposed onto the track.

Embodiments may therefore allow the driver of the vehicle to modify their track route in reaction to environmental conditions such as weather, their own previous performance as well as the historic performance of others.

Embodiments thus provide advantages to the safety and performance of the driver of a vehicle both on a road and on a track.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. An augmented reality system for assisting the driver of a vehicle being driven on a surface in an environment, the environment including one or more dynamic bodies, the system comprising:
    a display headset comprising an at least partially transparent display pane;
    a positioning system configured to determine the relative positions of the display headset, the vehicle, the surface and at least one dynamic body external to the vehicle; and
    a display driver configured to generate, in dependence on the relative positions determined by the positioning system, graphic elements on the at least partially transparent display pane, the display driver being configured such that, to a wearer of the display headset:
        at least one graphic element appears stationary relative to the display headset;
        at least one graphic element appears stationary relative to the vehicle notwithstanding motion of the display headset relative to the vehicle;
        at least one graphic element appears stationary relative to the surface; and
        at least one graphic element appears stationary relative to the at least one dynamic body external to the vehicle, and wherein the augmented reality system is configured to communicate with a display of the vehicle configured to display graphic elements and deactivate at least part of the vehicle display such that graphic elements are not duplicated on the vehicle display and the display headset of the augmented reality system.

2. The augmented reality system of claim 1, wherein the display driver is configured to display a first, second, third and fourth graphic element such that each graphic element appears, to the wearer of the display device, to move independently with respect to each of the other graphic elements and wherein
    the first graphic element appears, to the wearer of the display headset, stationary relative to the display headset;
    the second graphic element appears, to the wearer of the display headset, stationary relative to the vehicle;
    the third graphic element appears, to the wearer of the display headset, stationary relative to the surface; and
    the fourth graphic element appears, to the wearer of the display headset, stationary relative to the at least one dynamic body external to the vehicle.

3. The augmented reality system of claim 1, wherein the positioning system is arranged to characterize a vector between the viewpoint of the wearer of the display headset and each one of the display headset, the vehicle, the surface and the at least one dynamic body external to the vehicle.

4. The augmented reality system of claim 3, wherein the display driver generates graphic elements such that:

a vector between the viewpoint of the wearer of the display headset and the at least one graphic element which appears, to a wearer of the display headset, stationary relative to the display headset, does not move relative to any vector between the viewpoint of the wearer of the display headset and the display headset; and a vector between the viewpoint of the wearer of the display headset and the at least one graphic element which appears, to a wearer of the display headset, stationary relative to the vehicle, is equal in direction to the vector between the viewpoint of the wearer of the display headset and the vehicle; and a vector between the viewpoint of the wearer of the display headset and the at least one graphic element which appears, to a wearer of the display headset, stationary relative to the surface, is equal in direction to the vector between the viewpoint of the wearer of the display headset and the surface; and a vector between the viewpoint of the wearer of the display headset and the at least one graphic element which appears, to a wearer of the display headset, stationary relative to the at least one dynamic body external to the vehicle is equal in direction to the vector between the viewpoint of the wearer of the display headset and the at least one dynamic body external to the vehicle.

5. The augmented reality system of claim 1, wherein the at least one graphic element which, to the wearer of the display headset, appears stationary relative to the display headset, is any of warning signs, information regarding the operation of the vehicle, safety information or video content.

6. The augmented reality system of claim 1, wherein the at least one graphic element which, to the wearer of the display headset, appears stationary relative to the vehicle, is any of virtual instruments, information regarding the operation of the vehicle, navigation information or video content.

7. The augmented reality system of claim 1, wherein the at least one graphic element which, to the wearer of the display headset, appears stationary relative to the surface, is any of navigation information, track information and hazard identifiers.

8. The augmented reality system of claim 1, wherein the at least one graphic element which, to the wearer of the display headset, appears stationary relative to the at least one dynamic body external to the vehicle, is a hazard identifier.

9. The augmented reality system of claim 1, wherein the positioning system is configured to determine whether the at least one dynamic body external to the vehicle is moving with respect to the vehicle, and having determined that the at least one dynamic body external to the vehicle is moving with respect to the vehicle, is further configured to determine whether the at least one dynamic body is moving towards or away from the expected path of the vehicle.

10. The augmented reality system of claim 9, wherein the display driver is configured to generate a graphic element being a hazard identifier, which to the wearer of the display headset appears stationary relative to the at least one dynamic body, if the positioning system determines that the at least one dynamic body external to the vehicle is moving towards the expected path of the vehicle.

11. The augmented reality system of claim 9, wherein the display driver is configured to generate a graphic element being a braking or turning point indicator, which to the wearer of the display headset appears stationary relative to the surface, if the positioning system determines that the at least one dynamic body external to the vehicle is moving towards the expected path of the vehicle.

12. The augmented reality system of claim 1, wherein the surface is a road and the graphic elements comprise:
warning signs, which to the wearer of the display headset appear stationary relative to the display headset;
information regarding the operation of the vehicle, which to the wearer of the display headset, appear stationary relative to the vehicle;
navigation information, which to the wearer of the display headset, appear stationary relative to the road; and
hazard identifiers, which to the wearer of the display headset, appear stationary relative to the at least one dynamic body external to the vehicle.

13. The augmented reality system of claim 1, wherein the surface is a track and the graphic elements comprise:
warning signs, which to the wearer of the display headset appear stationary relative to the display headset;
information regarding the operation of the vehicle, which to the wearer of the display headset, appear stationary relative to the vehicle;
track information, which to the wearer of the display headset, appear stationary relative to the road; and
hazard identifiers, which to the wearer of the display headset, appear stationary relative to the at least one dynamic body external to the vehicle.

14. The augmented reality system of claim 1, wherein the augmented reality system is configured to obtain an environment map from a source external to the vehicle and the display driver is configured to generate graphic elements in dependence on track information provided by the environment map.

15. The augmented reality system of claim 1, wherein the at least one graphic element which, to wearer of the display headset, appears stationary relative to the surface, and is track information, is generated in dependence on one or more of braking point indicators, acceleration point indicators and driving lines.

16. The augmented reality system of claim 1, wherein the system is configured to record a first route taken by a vehicle driven on a surface; and upon the vehicle being driven again on the surface, the display driver being configured to display at least one graphic element, which to a wearer of the display headset appears stationary relative to the surface, wherein the at least one graphic element is a driving line which represents the first route taken by the vehicle.

17. The augmented reality system of claim 15, wherein the system is configured to record wheel slip of the vehicle during a first route taken by the vehicle on the surface; and upon the vehicle being driven again on the surface, the display driver being configured to display graphic elements, which to a wearer of the display headset appear stationary relative to the surface, wherein at least one graphic element indicates one or more portions of the first route in which wheel slip of the vehicle was recorded, and at least one graphic element is a driving line which indicates a second route to be taken by the vehicle, wherein the second route is formulated such that the vehicle avoids the one or more portions of the first route in which wheel slip of the vehicle was recorded.

18. The augmented reality system of claim 1, wherein the display headset comprises a pair of augmented reality glasses and the at least partially transparent display pane is one or more lenses of the augmented reality glasses or the display headset comprises a helmet and the at least partially transparent display pane is a visor of the helmet.

19. The augmented reality system of claim 1, wherein the graphic element which appears stationary relative to the vehicle notwithstanding motion of the display headset relative to the vehicle appears to be superimposed onto an element of the vehicle.

20. The augmented reality system of claim 19, wherein the element of the vehicle is any of a windscreen, a window or a steering wheel of the vehicle.

21. A method comprising:
determining the relative positions of:
a vehicle;
a display headset worn by a driver of the vehicle;
a surface on which the vehicle is being driven;
one or more dynamic bodies of an environment in which the vehicle is being driven, the one or more dynamic bodies being external to the vehicle;
generating first, second, third and fourth graphic elements on an at least partially transparent display pane of the display headset such that each graphic element appears, to the wearer of the display headset, to move independently with respect to each of the other graphic elements and wherein:
the first graphic element appears, to a wearer of the display headset, stationary relative to the display headset;
the second graphic element appears, to a wearer of the display headset, stationary relative to the vehicle notwithstanding motion of the display headset relative to the vehicle;
the third graphic element appears, to a wearer of the display headset, stationary relative to the surface; and
the fourth graphic element appears, to a wearer of the display headset, stationary relative to the at least one dynamic body external to the vehicle, and communicating with a display of the vehicle configured to display graphic elements and deactivating at least part of the vehicle display such that graphic elements are not duplicated on the vehicle display and the display headset of the augmented reality system.

22. The method of claim 21, wherein the graphic element which appears stationary relative to the vehicle notwithstanding motion of the display headset relative to the vehicle appears to be superimposed onto an element of the vehicle.

23. The method of claim 22, wherein the element of the vehicle is any of a windscreen, a window or a steering wheel of the vehicle.

* * * * *